UNIDIRECTIONALLY CONDUCTIVE DEVICE FOR VARYING THE OUTPUT SIGNAL FREQUENCY OF A SIGNAL GENERATOR
Filed Jan. 3, 1962
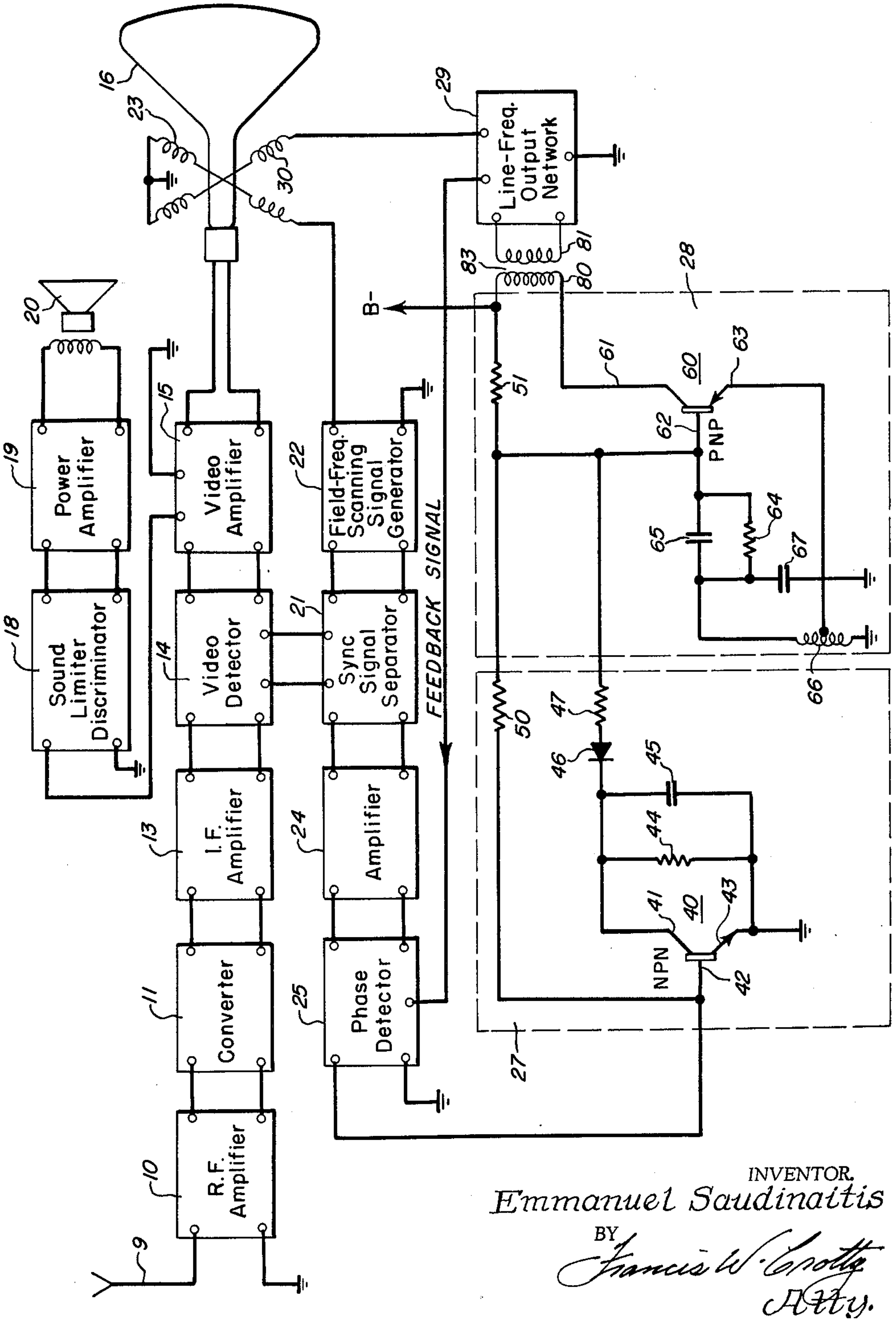
INVENTOR.
Emmanuel Saudinaitis
BY Francis W. Crotty
Atty.

3,205,452
Patented Sept. 7, 1965

3,205,452

UNIDIRECTIONALLY CONDUCTIVE DEVICE FOR VARYING THE OUTPUT SIGNAL FREQUENCY OF A SIGNAL GENERATOR

Emmanuel Saudinaitis, Glencoe, Ill., assignor to Zenith Radio Corporation, Chicago, Ill., a corporation of Delaware Filed Jan. 3, 1962, Ser. No. 164,122
2 Claims. (Cl. 331—8)

This invention relates to wave signal translating apparatus and more particularly to automatic frequency control circuitry which may be employed to control the line frequency oscillator of a television receiver.

In conventional television receivers, it is of prime importance to keep certain signal generators in phase with corresponding components of a television transmitting station which radiates a signal having sound, video, and synchronizing components. The synchronizing components are customarily employed to keep the line frequency and field frequency generators of the receiver in synchronism with the transmitting equipment. To this end, it is customary to compare the transmitted synchronizing information with locally generated signals to produce an error signal indicative of their phase relation. The error signal is applied to a variable reactance device which changes the frequency of the generator in order to establish and maintain a preselected phase relation. In conventional tube-type television circuitry, reactance or control tubes respond to the error signal to control phase but they are not practical for use in transistor type television receivers.

In lieu of the reactance tube, the art sometimes employs voltage sensitive variable capacitors particularly in adjusting the local oscillator of frequency-modulation radio receivers. These devices have proved to be satisfactory in such receivers because the operating frequency is in the megacycle range wherein a small change in capacitance provides a substantial change in reactance. However, the horizontal oscillator of a television receiver operates at approximately 15 kilocycles, and the capacitance variation obtainable at this frequency with currently available voltage-sensitive capacitive devices is insufficient.

It is well known that the frequency of oscillation of certain types of transistor oscillators may be controlled by varying the resistive load of their base circuits. One of the most conventional circuits operating on this principle is the variable time-constant-controlled Hartley oscillator. As the resistive load of the base circuit is varied, the relative phase of the currents in the base and emitter circuits of the transistor is varied to bring about a corresponding change in the operating frequency of the oscillator. This type of frequency-control operation is entirely conventional and well known in the art.

In using this approach to automatic frequency or phase control, a variable resistance in the form of the output circuit of a transistor is coupled to the oscillator to contribute a variable resistance to its base circuit. However, it is necessary to isolate the variable resistor from alternating voltages developed in the controlled oscillator to prevent unbalanced operation of the transistor serving as a variable resistance.

It is a primary object of the invention to overcome deficiencies and disadvantages of prior automatic frequency control circuits previously mentioned.

It is a further object of this invention to provide a new and improved control circuit for adjusting the frequency of oscillation of a local oscillator of a television receiver.

It is still another object of the invention to provide a self-biased variable resistance error-signal-responsive device for phase control of the horizontal oscillator of a transistor television receiver.

In accordance with the invention, an automatic frequency control circuit, such as that which may be employed in conjunction with the horizontal oscillator of a television receiver, comprises a source of reference signal and a generator for producing a local signal the phase of which may be varied. In addition, the control circuit comprises means for comparing the phase of the reference signal and the local signal to produce an error signal indicative of their phase relation. The control circuit also includes a variable resistance device and means for applying the error signal to the device for varying the resistance thereof. A unidirectional signal conducting means couples the resistance device to the generator to vary the operating frequency of the generator in accordance with the effective resistance of the device. In addition, further means coupled between the device and the generator and including the unidirectional means and a filter network develops a bias potential for the variable resistance device to establish a predetermined operative state therein.

The features of this invention which are believed to be novel are set forth with particularity in the appended claims. The invention, together with further objects and advantages thereof, may best be understood, however, by reference to the following description taken in conjunction with the accompanying drawing, the single figure of which is a schematic diagram of a television receiver embodying the automatic frequency control apparatus of the invention.

The receiver, as shown, comprises a receiving antenna 9 coupled to a radio-frequency amplifier 10 of one or more stages which includes means for selecting one of the transmitted signals. The selected signal is coupled from amplifier 10 to a converter 11 which provides an intermediate-frequency signal. The output of the converter is translated to an intermediate-frequency amplifier 13 of one or more stages and a video detector 14 is coupled thereto to receive the amplified intermediate-frequency signal. Coupled to the output of video detector 14 is a video amplifier 15 which translates the amplified detected video components to a cathode ray tube or other image reproducing device 16. An intercarrier-sound signal component also derived by detector 14 and amplified by video amplifier 15 is translated to a limiter-discriminator 18 which is coupled between amplifier 15 and a power amplifier 19. A speaker 20 is coupled to the output of power amplifier 19 in conventional fashion.

Video detector 14 is also provided with an output for translating detected field and line synchronizing signal components present in the received television signal. A synchronizing-signal-separator 21 is coupled to this output and provides information for synchronizing the scanning apparatus associated with image reproducing device 16. A field frequency scanning signal generator 22 is coupled to one output of sync-signal-separator 21 and has conventional field frequency scanning coils 23 coupled to its output terminals. A line frequency signal translating network comprising the series arrangement of an amplifier 24, a phase detector 25, a variable resistance network 27, and an oscillator 28 is coupled between signal-separator 21 and a line frequency output network 29. Oscillator 28 produces a local signal which is variable in phase by frequency adjustment of the oscillator in accordance with the subject invention as described more particularly hereinafter. Conventional line frequency deflection coils 30 are coupled to line frequency output network 29. In addition, line frequency output network 29 provides a feedback signal to phase detector 25. If desired automatic gain control of the radio-frequency and intermediate-frequency stages may be provided.

The described receiver, except for its automatic frequency or phase control arrangement to be considered more particularly hereafter, is conventional. Incoming composite television signals intercepted by antenna 9 are applied to and amplified by adio-frequency amplifier 10. The selected signal is applied to converter 11 which heterodynes it with locally generated oscillations to develop an intermediate-frequency signal which is amplified by amplifier 13. This amplified signal is applied to video detector 14 which derives the synchronizing, video and sound components. The video and sound components are translated to video amplifier 15 which provides amplified video components for use by image reproducer 16. The sound components in the form of a frequency-modulated intercarrier signal are supplied to limiter and discriminator 18, wherein the audio components are derived and after amplification by power amplifier 19 they drive speaker 20 which produces the audio portion of the telecast.

The synchronizing signal components supplied by detector 14 are separated into field and line components, the field frequency components being translated to generator 22 which provides a deflection signal for the field or vertical yoke 23. The horizontal synchronizing output of signal separator 21 serves as a source of reference signal which is applied through amplifier 24 to phase detector 25. This detector comprises means for comparing the phase of the reference signal and the local signal of horizontal-frequency generator 28 to produce an error signal indicative of their phase relation. The error signal developed in the phase detector is applied to variable resistance network 27 which controls the operating frequency of generator 28 to maintain synchronization. The output of generator 28 is supplied to network 29 which supplies a deflection signal to horizontal yoke 30.

More particular consideration will now be given to the automatic frequency control arrangement comprising variable resistance network 27 which includes a first electron device or NPN transistor 40 having a collector or output electrode 41, a base or input electrode 42 and an emitter electrode 43. The base electrode 42 is coupled to the output of the phase detector by way of a conductor which serves as means for applying the error signal to device 40 while emitter 43 is grounded. Coupled between the collector and emitter electrodes of transistor 40 is a fixed load resistor 44 having a filter capacitor 45 in parallel relation therewith. Also coupled to output electrode 41 is the cathode of a diode 46 which has a current limiting resistor 47 coupled to its anode terminal. A positive or forward biasing potential is applied to base 42 of transistor 40 by way of a biasing resistor 50 coupled to the base of the transistor of generator 28.

Generator 28 comprises a second electron device or PNP transistor 60 having a collector 61, base 62 and emitter 63. Base 62 is coupled to one terminal of a parallel base-leak network comprising a resistor 64 and a capacitor 65. The remaining terminal of the network is coupled to the high-potential terminal of a parallel resonant tank circuit, inductor 66 and a capacitor 67, of a Hartley-type oscillator 28. The other terminal of tank circuit 66, 67 is coupled to ground. Emitter 63 of transistor 60 is coupled to a tap on inductor 66. The operating frequency of the oscillator is determined by circuit elements 66, 67 and the effective resistance of the base circuit which is variable due to the influence of transistor 40.

The base of transistor 60 receives a forward biasing potential by way of resistor 51; however, the base current develops a positive voltage across network 64, 65 which is applied to base 42 of transistor 40 by way of resistor 50 as previously explained. In addition, base 62 is coupled to the collector of transistor 40 through resistor 47 and diode 46, a unilaterally conductive device. The collector electrode 61 of transistor 60 is coupled to potential source —B by way of a primary winding 80 of an output transformer 83 and thus attains a reverse bias. A secondary winding 81 of transformer 83 delivers the locally generated horizontal signal to line-frequency network 29.

It is generally known that a conventional transistor, presents a substantial resistive impedance across its emitter and collector terminals. The value of this resistive impedance can be varied in response to a signal applied to the transistor base. Accordingly, transistor 40 is biased to be conductive and to constitute a variable resistance of a reference value, with phase detector 25 serving as means for applying a phase error signal to its base 42 to control its effective resistance in response to the applied signal.

The resistive component of the base circuit of transistor 60 primarily comprises current limiting resistor 47, diode 46, and the parallel combination of resistor 44 and the variable resistance presented between collector and emitter of transistor 40. With this arrangement, the effective load resistance of the base circuit varies with amplitude variations of the control signal applied to transistor 40 from phase detector 25. In other words, phase detector 25 causes transistor 40 to be conductive and to represent a nominal or reference value of resistance during intervals in which proper phase conditions exist. However, deviations of phase from this norm results in making the transistor more or less conductive so that the resistance presented between its collector and emitter changes accordingly.

The nominal operating frequency of oscillation generator 28 is primarily determined by tank circuit 66, 67 and corresponds approximately to the line scanning frequency. Since the locally generated signal appears between the base and emitter of transistor 60, collector 41 of transistor 40 cannot be directly coupled to base 62 of transistor 60. If it were coupled through a bi-directional circuit to base 62, the locally generated signal would cause unsymmetrical operation of transistor 40 by varying its collector bias point is accordance with the alternating current potential of the tank circuit. The inclusion of diode 46 in the coupling renders the circuit unidirectional to isolate collector 41 from alternating current potential variations to maintain symmetrical operation of the device. At the same time, the diode rectifies the oscillator signal to develop in network 44, 45 a potential to reverse bias transistor 40 to a predetermined operating state or conductivity from which its resistance may be varied in response to the applied control signal.

In considering the operation of the described automatic frequency control circuit, it will be assumed that initially the oscillations developed in horizontal generator 28 have the desired phase relation with respect to the horizontal synchronizing components of the received telecast. For these conditions, oscillation generator 60 developes an output signal of a frequency determined primarily by resonant circuit 66, 67. The oscillator not only energizes the horizontal deflection system of the receiver but also causes a comparison signal to be applied to phase detector 25 which is compared with the horizontal synchronizing component of the received signal. For the assumed condition of phase synchronism, the output of detector 25 has a reference value thereby establishing a reference bias point at base 42 of transistor 40. The other operating parameters, including the collector bias developed by rectification of the local oscillation in diode 46, cause transistor 40 to contribute a reference value of resistance to the base circuit of transistor 60. If operating conditions change or if for any reason the desired phase relation of the received synchronizing signal and the locally generated signal should change, this is reflected as a change in the output of phase detector 25 or in the error signal applied to transistor 40. As a consequence, the bias point at base 42 is varied and the effective resistance between the emitter and collector terminals of transistor 40 changes as well. Thus the resistive impedance of the base circuit of transistor 60 varies in either direction from a nominal value in accordance with variations of phase of the output signal of generator 28 from leading to lagging. This variation in resistive impedance modifies the operating frequency of the oscillator by changing the phase of the feedback circuit in conventional fashion to restore and maintain a desired phase condition.

More specifically, if the output signal of generator 28 is of a frequency lower than that of the line scanning frequency, the phase detector will produce a more positive output signal. When the base of transistor 40 becomes more positive the resistance present between electrodes 41 and 43 decreases and results in a reduction of the base load of transistor 60. As the base load becomes smaller, the frequency of the oscillator output signal is increased relative to that of the incoming line frequency synchronizing signal. Similarly, if the oscillator's output signal is at too high a frequency, it is reduced in an analogous manner.

As illustrated the only collector biasing potential for transistor 40 is that provided by diode 46 but an additional potential source may be utilized if desired. Furthermore, the horizontal oscillator need not be of the Hartley-type shown.

The invention provides a new and improved automatic frequency control circuit for use in a television receiver. By employing a variable resistance device, such as a transistor, the frequency of oscillation of a conventional local oscillator may be automatically varied in response to an applied error signal. By rectifying the local signal from the tank circuit of the oscillator, a biasing potential is developed for the transistor employed as a variable resistance while concurrently protecting that transistor from the adverse effects of an A.-C. bias potential.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. An automatic frequency control circuit comprising:

a source of reference signal;

a generator for producing a local sinusoidal signal the phase of which may be varied;

means for comparing the phase of said reference signal and said local signal to produce an error signal indicative of their phase relation;

a variable resistance device;

means for applying said error signal to said device for varying the resistance thereof;

unidirectional signal conducting means for coupling said resistance device to said generator to vary the operating frequency thereof in accordance with the effective resistance of said device; and means coupled to said device and to said generator and including said unidirectional signal conducting means and a filter network for developing a bias potential for said variable resistance device to establish a predetermined operative state therein.

2. An automatic frequency control circuit comprising:

a source of reference signal;

a generator, including a first transistor having a base electrode, for producing a local sinusoidal signal the phase of which may be varied;

means for comparing the phase of said reference signal and said local signal to produce an error signal indicative of their phase relation;

a second transistor having a control terminal and effectively having a variable resistance appearing at its output terminal;

means for applying said error signal to said control terminal of said second transistor for varying the resistance thereof;

a diode having its cathode electrode coupled to said output terminal of said second transistor and its anode electrode coupled to said base electrode of said first transistor to vary the operating frequency of said generator in accordance with the effective resistance of said second transistor; and means coupled to said second transistor and to said generator and including said diode and a filter network for rectifying at least a portion of the local signal present in said generator to bias said second transistor to a predetermined operative state.

References Cited by the Examiner

UNITED STATES PATENTS

| | | | |
|---|---|---|---|
| 2,543,902 | 3/51 | Dye | 331—186 X |
| 2,598,370 | 5/52 | Gruen | 331—20 |
| 2,777,057 | 1/57 | Pankove. | |
| 2,851,592 | 9/58 | Webster | 331—185 X |
| 3,077,567 | 2/63 | Gray | 332—16 |

ROY LAKE, *Primary Examiner.*

JOHN KOMINSKI, *Examiner.*